United States Patent [19]

Friedman

[11] Patent Number: 4,772,107
[45] Date of Patent: Sep. 20, 1988

[54] WIDE ANGLE LENS WITH IMPROVED FLAT FIELD CHARACTERISTICS

[75] Inventor: Irwin Friedman, Weston, Conn.

[73] Assignee: The Perkin-Elmer Corporation, Norwalk, Conn.

[21] Appl. No.: 927,215

[22] Filed: Nov. 5, 1986

[51] Int. Cl.$^4$ .......................... G02B 9/00; G02B 3/00; G02B 9/04
[52] U.S. Cl. .................................. 350/463; 350/412; 350/479
[58] Field of Search ................ 350/412, 463, 432, 479

[56] References Cited

U.S. PATENT DOCUMENTS

| 4,001,766 | 1/1977 | Hurwitz | 350/412 |
| 4,350,411 | 9/1982 | Rogers | 350/412 X |
| 4,411,499 | 10/1983 | Abel et al. | 350/412 X |

Primary Examiner—John K. Corbin
Assistant Examiner—Ronald M. Kachmarik
Attorney, Agent, or Firm—Thomas P. Murphy; Edwin T. Grimes; Francis L. Masselle

[57] ABSTRACT

There is disclosed an improvement in wide angle lenses wherein very flat field characteristics are achieved. This is accomplished by a novel two element field flattener just before the image plane. One of the elements is positive and the other negative. It is possible to thereby correct both third and fifth order Petzval curvature, as well as third and fifth order distortion.

2 Claims, 8 Drawing Sheets

WIDE ANGLE LENS WITH IMPROVED FLAT FIELD CHARACTERISTICS

TECHNICAL FIELD

This invention relates to optical lens design. In particular, it pertains to a wide angle lens having very flat field characteristics suitable for use in "step and repeat" microlithography.

BACKGROUND

Lenses usable in step and repeat microlithography must have high numerical apertures and must have fields as flat as possible in order to reproduce the reticle pattern accurately onto the surface of a wafer.

In conventional optical designs for such applications, the third order Petzval curvature is left partly undercorrected. That is, it is curved inward toward the lens so that at some point in the field the third order Petzval just balances the fifth order Petzval. The fifth order Petzval is usually positive, or over corrected, and curves away from the lens. Thus, at the point where the third and fifth order Petzval just balance, the curvature of field is zero and the position of best focus corresponds to the paraxial focus. By choosing a different focus on axis than the best focus, a better balance can be achieved so that, at two points in the field, the position of best focus corresponds to the image plane.

The position of best focus includes factors other than Petzval curvature. However, Petzval curvature has a strong influence and results in a field which, at low values of image height curves inward but, at large values of image height, curves outward from the lens. It has been discovered that a single strong field lens may be used to correct the third order Petzval curvature. However, it has also been determined that no amount of bending of the strong field lens will correct the fifth order Petzval and, in fact, only adds additional over correction. An example of a field flattener employed to correct third order field curvature is disclosed in U.S. Pat. No. 2,846,923 of A. W. Tronnier. In the system disclosed in this patent, third and fifth order distortion remained when such a field flattener was employed.

DISCLOSURE OF INVENTION

In accordance with the present invention, the single element field flattener is replaced by two elements—one negative and the other positive. By suitably bending these elements, it is possible to correct both third and fifth order Petzval curvature as well as third and fifth order distortion.

BEST MODE FOR CARRYING OUT THE INVENTION

Figure 1:
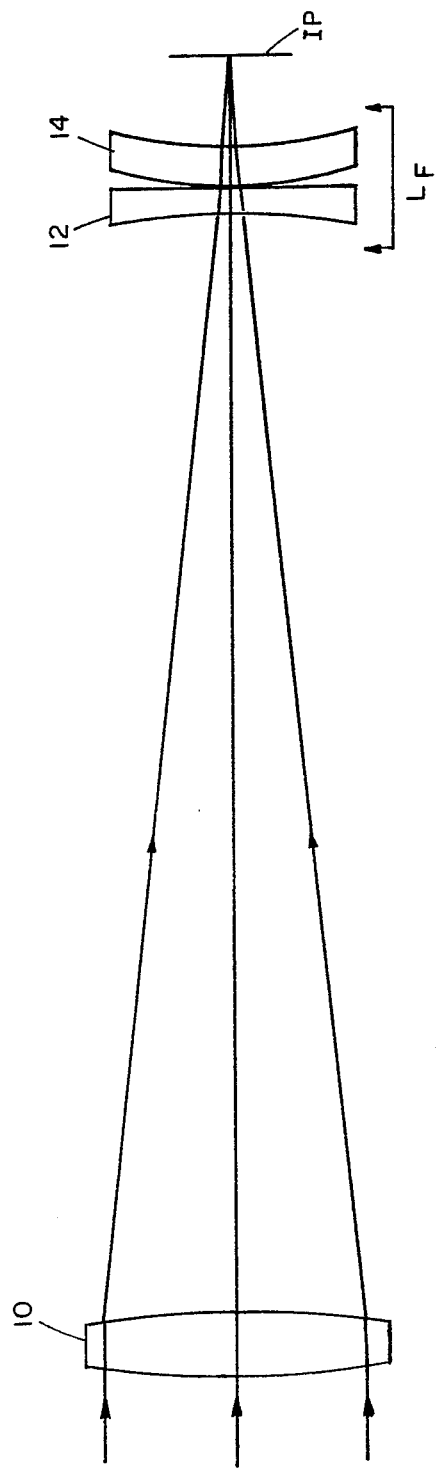
FIG. 1 is a lens diagram of a singlet having a field flattener in accordance with the invention.

The invention will first be described in connection with its use with a singlet. With particular reference to FIG. 1, there is illustrated a singlet 10 and a compound field flattener $L_F$ comprising negative element 12 and positive element 14. The prescription of the lens assembly of FIG. 1 is given in Table I (dimensions in mm).

TABLE I

SINGLET WITH COMPOUND FIELD FLATTENER
Wavelength 0.58760 μm

| SURFACE | RADIUS | THICKNESS | INDEX | |
|---|---|---|---|---|
| 1 | INF | 0.0 | 1.00000 | STOP |
| 2 | 103.3599 | 5.0000 | 1.51680 | BK 7 |
| 3 | −103.3599 | 88.0843 | 1.00000 | AIR |
| 4 | −49.1104 | 2.0000 | 1.51680 | BK 7 |
| 5 | 419.8321 | 0.1000 | 1.00000 | AIR |
| 6 | 30.8503 | 3.0000 | 1.51680 | BK 7 |
| 7 | 34.4587 | 8.4694 | 1.00000 | AIR |
| 8 | INF. | 0.0 | 1.00000 | IMAGE |

The following table gives the power of each surface of the singlet 10 and the compound field flattener $L_F$.

TABLE II

SINGLET WITH COMPOUND FIELD FLATTENER
POWER OF SURFACES

| SURFACE | POWER OF SURFACE | POWER OF ELEMENT | POWER OF GROUP | |
|---|---|---|---|---|
| 1 | | | | STOP |
| 2 | +.005 | +0.0100 | +.0100 | Singlet |
| 3 | +.005 | | | |
| 4 | −.0105232 | −.011754 | −.0100 | Compound Field Flattener |
| 5 | −.0012309 | | | |
| 6 | +.0167518 | +.001754 | | |
| 7 | −.0149976 | | | |

The second and third surfaces are the positive singlet and each surface has a power +0.005 for a total power of +0.010. The compound field flattener $L_F$ is made up of surfaces 4, 5, 6, and 7 which have a total power of −0.010 which just balances the power of the singlet and results in a fully corrected third order Petzval curvature. Negative element surfaces 4 and 5 over correct the third order Petzval curvature by only 17.5% in that its power is −0.01175 rather than −0.0100. Thus, the negative element 12 of the field flattener $L_F$ over corrects the curvature of field by only a slight amount. The positive element 14 adds back the 17.5% over correction.

The following table gives the third order surface by surface contributions of the FIG. 1 lens assembly.

Table IV gives the fifth order surface by surface contribution of the lens assembly of FIG. 1.

TABLE IV

FIFTH ORDER SURFACE BY SURFACE CONTRIBUTIONS
SINGLET WITH COMPOUND FIELD FLATTENER

|  | SPH. | COMA | AST. | DIST. | PETZ. |
|---|---|---|---|---|---|
| 1 | | | | | |
| 5th Intr | 0.0 | 0.0 | 0.0 | 0.0 | 0.0 |
| 5th Totl | 0.0 | 0.0 | 0.0 | 0.0 | 0.0 |
| 2 | | | | | |
| 5th Intr | −3.016D-07 | −4.423D-06 | 5.808D-07 | 2.241D-04 | 6.687D-05 |
| 5th Totl | −3.016D-07 | −4.423D-06 | 5.808D-07 | 2.241D-04 | 6.687D-05 |
| 3 | | | | | |
| 5th Intr | −1.785D-05 | 1.405D-04 | −1.087D-04 | 1.723D-04 | −8.022D-07 |
| 5th Totl | −2.277D-05 | 1.325D-04 | −9.549D-05 | −2.235D-04 | 1.139D-04 |
| 4 | | | | | |
| 5th Intr | −5.040D-08 | 2.926D-06 | 6.500D-05 | 4.233D-05 | −4.612D-05 |
| 5th Totl | −1.008D-06 | −1.622D-05 | −9.478D-05 | −1.210D-05 | −1.519D-05 |
| 5 | | | | | |
| 5th Intr | −2.604D-08 | 1.200D-06 | −1.282D-04 | 7.750D-04 | 3.865D-05 |
| 5th Totl | −9.995D-07 | 2.031D-05 | −2.622D-04 | 1.029D-03 | 9.701D-05 |
| 6 | | | | | |
| 5th Intr | −1.685D-08 | 1.283D-06 | 7.658D-05 | 4.291D-02 | −1.525D-03 |
| 5th Totl | 1.339D-06 | −5.625D-05 | 6.161D-04 | 3.839D-02 | −2.009D-03 |
| 7 | | | | | |
| 5th Intr | −2.302D-09 | 9.508D-07 | −5.860D-04 | −1.332D-02 | 1.203D-03 |
| 5th Totl | −1.344D-06 | 3.833D-05 | 3.671D-04 | −3.941D-02 | 1.746D-03 |
| 3rd | −2.733D-03 | 3.955D-03 | −7.758D-03 | −5.269D-09 | −6.929D-09 |
| 5th Totl | −2.508D-05 | 1.142D-04 | 5.312D-04 | 1.204D-07 | −2.584D-09 |
| TOTAL | SPH. | COMA | AST. | DIST. | PETZ. |
| 3rd | −2.733D-02 | 1.187D-01 | −1.552D-01 | −5.269D-08 | −6.929D-08 |
| 5th | −2.508D-04 | 1.142D-03 | 2.125D-02 | 1.204D-06 | −2.584D-08 |
| T. OB. S. | −3.834D-03 | 5.976D-03 | T. EL. COMA | | |
| S. OB. S. | −1.001D-03 | 7.864D-04 | S. EL. COMA | | |
| | | | FIELD ANGLE | | |
| | | | 1.000D 01 | | |

Inspection of Table IV will indicate that the correction of the fifth order Petzval curvature is provided by the meniscus positive element 14 of the field flattener $L_F$.

The third and fifth order aberrations of the lens of FIG. 1 is given in the following table.

TABLE III

THIRD ORDER SURFACE-BY-SURFACE CONTRIBUTIONS
SINGLET WITH COMPOUND FIELD FLATTENER

|  | SPH. | COMA | AST. | DIST. | PETZ. |
|---|---|---|---|---|---|
| 2 | | | | | |
| 3RD | −1.842D-04 | −6.119D-04 | −2.033D-03 | −1.700D-02 | −3.084D-03 |
| 3 | | | | | |
| 3RD | −2.604D-03 | 4.099D-03 | −6.452D-03 | 1.501D-02 | −3.084D-03 |
| 4 | | | | | |
| 3RD | 8.985D-05 | 2.014D-04 | 4.515D-04 | 1.556D-02 | 6.490D-03 |
| 5 | | | | | |
| 3RD | −3.040D-05 | 2.632D-04 | −2.279D-03 | 1.316D-02 | 7.592D-04 |
| 6 | | | | | |
| 3RD | 1.106D-05 | −3.276D-04 | 9.703D-03 | 1.861D-02 | −1.033D-02 |
| 7 | | | | | |
| 3RD | −1.536D-05 | 3.313D-04 | −7.148D-03 | −4.534D-02 | 9.250D-03 |
| 3RD | −2.733D-03 | 3.955D-03 | −7.758D-03 | −5.333D-09 | −6.940D-09 |
| TOTAL | SPH. | COMA | AST. | DIST. | PETZ. |
| 3RD | −2.733D-02 | 1.187D-01 | −1.552D-01 | −5.333D-08 | −6.940D-08 |
| | PUP. DISP. (3) | | FIELD | PUP. SPH. | |
| | 0.0 | | 1.000D 01 | 5.866D-01 | |

Examination of the table above indicates that surface 4, the first surface of the field flattener $L_F$ provides most of the third order field flattening.

TABLE V

THIRD & FIFTH ORDER ABERRATIONS
SINGLET WITH COMPOUND FIELD FLATTENER

|  | SPH. | COMA | AST. | DIST. | PETZ. |
|---|---|---|---|---|---|
| 3RD | −2.733D-02 | 1.187D-01 | −1.552D-01 | −5.269D-08 | −6.929D-08 |
| 5th | −2.508D-04 | 1.142D-03 | 2.125D-02 | 1.204D-06 | −2.584D-08 |

TABLE V-continued

THIRD & FIFTH ORDER ABERRATIONS
SINGLET WITH COMPOUND FIELD FLATTENER

|  | SPH. | COMA | AST. | DIST. | PETZ. |
|---|---|---|---|---|---|
| TOB | −3.834D-03 | 5.976D-03 | T. EL. COMA | | |
| SOB | −1.001D-03 | 7.864D-04 | S. EL. COMA | | |
| | | | Field Angle | | |
| | | | 1.000D 01 | | |

Figure 2:
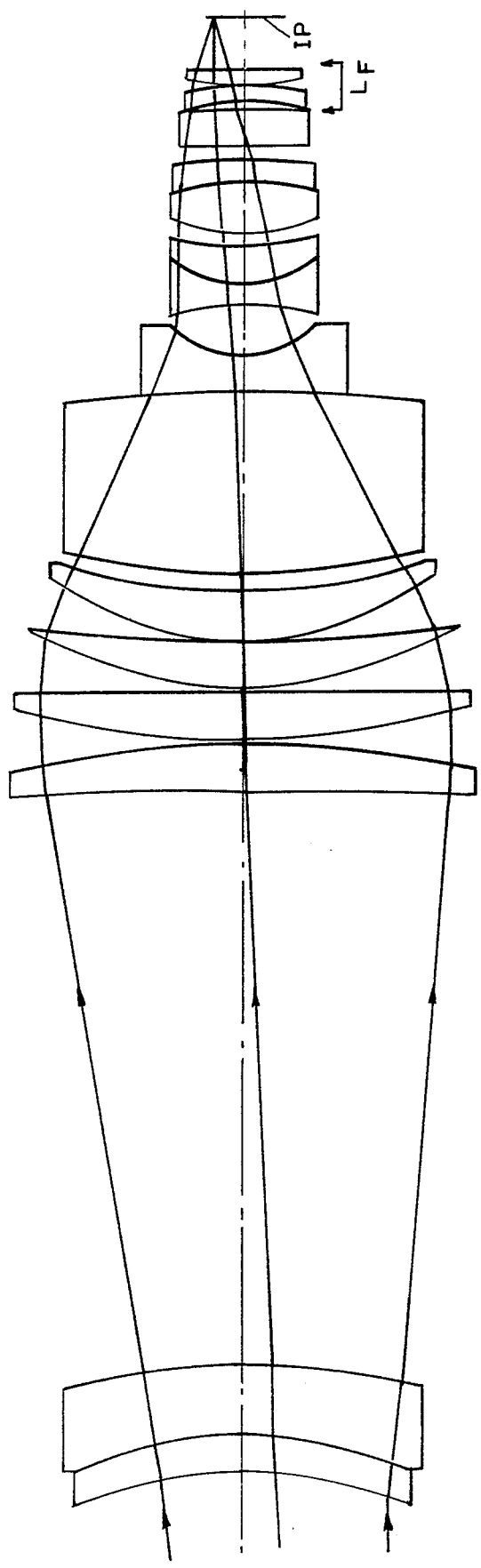
FIG. 2 is an optical diagram of a multi-element lens having the field flattener of the invention.

The field flattener of this invention may also be employed with a more complex lens assembly such as illustrated in FIG. 2. This is a refractive design with a magnification of −0.2X, NA=0.35, with a track length of 1,000 mm, and corrected at a wavelength of $\lambda=0.4047$ μm. The prescription is given in Table VI.

TABLE VI

FIFTH-ORDER PETZVAL CORRECTED
Wavelength 0.40470 μm

| SURFACE | RADIUS | THICKNESS | INDEX | GLASS |
|---|---|---|---|---|
| 1 | INF | 556.2644 | 1.00000 | OBJECT |
| 2 | −133.1436 | 11.3542 | 1.81435 | SF 55 |
| 3 | −132.7156 | 21.0836 | 1.65843 | LAK 21 |
| 4 | −232.8650 | 175.0120 | 1.00000 | AIR |
| 5 | −2811.2963 | 15.1389 | 1.65843 | LAK 21 |
| 6 | −318.1744 | 1.2500 | 1.00000 | AIR |
| 7 | 290.7742 | 15.1389 | 1.63773 | SK 16 |
| 8 | −2479.7843 | 0.0 | 1.00000 | AIR |
| 9 | INF | 0.0 | 1.00000 | STOP |
| 10 | 129.4229 | 15.1389 | 1.63773 | SK 16 |
| 11 | 515.6588 | 0.0 | 1.00000 | AIR |
| 12 | 102.9164 | 15.1389 | 1.65843 | LAK 21 |
| 13 | 206.3610 | 5.5221 | 1.00000 | AIR |
| 14 | 242.1995 | 55.1378 | 1.65843 | LAK 21 |
| 15 | −683.7134 | 11.3540 | 1.81435 | SF 55 |
| 16 | 33.2985 | 15.0000 | 1.00000 | AIR |
| 17 | −120.6848 | 6.2500 | 1.71066 | SF 5 |
| 18 | 36.3557 | 13.0000 | 1.83238 | LASF 1 |
| 19 | 141.9656 | 3.7847 | 1.00000 | AIR |
| 20 | 69.3384 | 15.0000 | 1.67774 | LAK 11 |
| 21 | −83.0783 | 6.2500 | 1.60666 | LF 5 |
| 22 | −939.6681 | 3.7847 | 1.00000 | AIR |
| 23 | 427.5070 | 12.5000 | 1.71066 | SF 5 |
| 24 | −343.7898 | 2.0000 | 1.00000 | AIR |
| 25 | −79.7206 | 4.0000 | 1.63773 | SK 16 |
| 26 | −203.5454 | 0.5000 | 1.00000 | AIR |
| 27 | 65.2471 | 5.0000 | 1.63773 | SK 16 |
| 28 | −1178.0672 | 15.2380 | 1.00000 | AIR |
| 29 | INF | −0.0080 | 1.00000 | IMAGE |

Table VII gives the third and fifth order aberrations when traced from the object to the image.

TABLE VII

THIRD & FIFTH ORDER ABERRATIONS
FIFTH-ORDER PETZVAL CORRECTED

|  | SPH. | COMA | AST. | DIST. | PETZ. |
|---|---|---|---|---|---|
| 3rd | −1.524D-02 | −2.579D-03 | −1.639D-03 | −8.462D-04 | −1.956D-03 |
| 5th | 2.081D-02 | 7.988D-03 | 2.358D-03 | 1.234D-03 | 6.865D-05 |
| TOB | 1.126D-02 | −2.332D-04 | T. EL. COMA | | |
| SOB | 6.542D-03 | 5.578D-04 | S. EL. COMA | | |
| | OBJECT HEIGHT | | PUP. SPH. | | |
| | −6.000D 01 | | −7.907D-03 | | |

Figure 3:
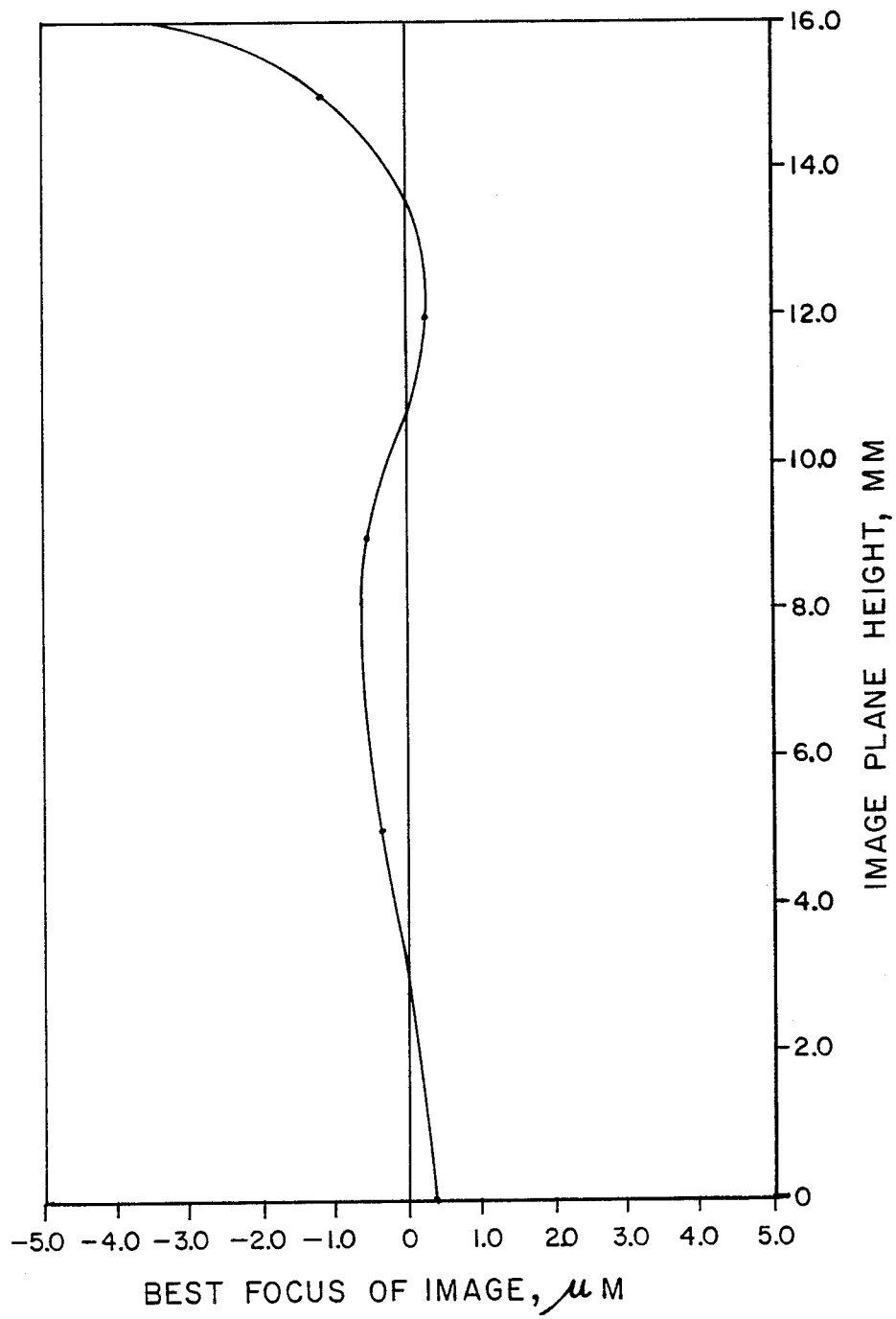
FIG. 3 is a plot of best focus versus height of image for the lens of FIG. 2.

It will be noted that the fifth order Petzval curvature has been completely corrected and the third order Petzval is substantially reduced. FIG. 3 is the plot of best focus versus image height of the lens of FIG. 2. It will be noted that, with the fifth order Petzval curvature corrected, the seventh order Petzval, which is negative, becomes dominant at the edge of the field. As a result, the best focus curves back in towards the lens, resulting in a third cross-over point. Accordingly, there is achieved a much flatter field and a wider field of good correction than has heretofore been achievable.

Figure 4:
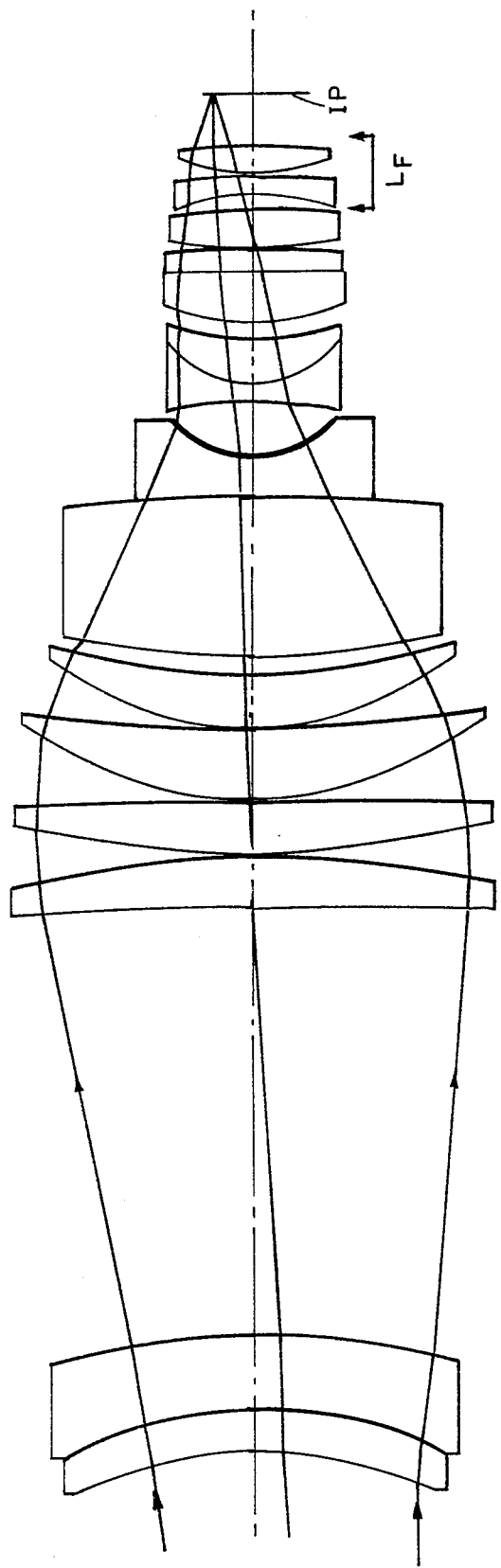
FIG. 4 is a diagram of a modified version of the lens of FIG. 2.

It is often better to control the fifth order Petzval rather than to completely correct it. This allows the focus and the 3rd, 5th, and 7th order Petzval to be balanced for best overall field characteristics. A lens assembly of such a design is illustrated in FIG. 4 and its prescription given in Table VIII below.

TABLE VIII

FIFTH ORDER PETZVAL SMALL BUT NOT ZERO
Wavelength 0.40470 μm

| SURFACE | RADIUS | THICKNESS | INDEX | GLASS |
|---|---|---|---|---|
| 1 | INF | 610.0060 | 1.00000 | OBJECT |
| 2 | −130.9963 | 11.3542 | 1.81435 | SF 55 |
| 3 | −126.6507 | 21.0836 | 1.65843 | LAK 21 |
| 4 | −243.0733 | 123.5394 | 1.00000 | AIR |
| 5 | −2248.5749 | 15.1389 | 1.65843 | LAK 21 |
| 6 | −281.8421 | 0.6250 | 1.00000 | AIR |
| 7 | INF | 0.6250 | 1.00000 | STOP |
| 8 | 325.7025 | 15.1389 | 1.63773 | SK 16 |
| 9 | −1342.9962 | 0.0 | 1.00000 | AIR |
| 10 | 114.4374 | 20.0000 | 1.63773 | SK 16 |
| 11 | 522.2741 | 0.0 | 1.00000 | AIR |
| 12 | 98.3559 | 15.1389 | 1.65843 | LAK 21 |
| 13 | 195.8588 | 5.5221 | 1.00000 | AIR |
| 14 | 271.4137 | 46.2194 | 1.65843 | LAK 21 |
| 15 | −588.7853 | 11.3540 | 1.81435 | SF 55 |
| 16 | 33.1853 | 15.0000 | 1.00000 | AIR |
| 17 | −122.5435 | 6.2500 | 1.71066 | SF 5 |
| 18 | 36.1040 | 13.0000 | 1.83238 | LASF 1 |
| 19 | 120.0385 | 3.7847 | 1.00000 | AIR |
| 20 | 67.9515 | 15.0000 | 1.67774 | LAK 11 |
| 21 | −320.2550 | 6.2500 | 1.60666 | LF 5 |
| 22 | −461.0720 | 1.0000 | 1.00000 | AIR |
| 23 | 334.9249 | 10.0000 | 1.71066 | SF 5 |
| 24 | −392.5363 | 5.0000 | 1.00000 | AIR |
| 25 | −71.7337 | 5.0000 | 1.63773 | SK 16 |
| 26 | −195.2576 | 0.5000 | 1.00000 | AIR |
| 27 | 70.8591 | 8.0000 | 1.63773 | SK 16 |
| 28 | −345.9020 | 15.2398 | 1.00000 | AIR |
| 29 | INF | −0.0098 | 1.00000 | IMAGE |

The foregoing refractive design also has the same magnification, NA, track length, and corrected wavelength as the design shown in FIG. 2. The third and fifth order aberrations, with the fifth order Petzval limited but not zero, are given in Table IX.

TABLE IX

THIRD & FIFTH ORDER ABERRATIONS
FIFTH ORDER PETZVAL SMALL BUT NOT ZERO

|     | SPH.         | COMA        | AST.        | DIST.       | PETZ.       |
|-----|--------------|-------------|-------------|-------------|-------------|
| 3rd | −1.864D-02   | −4.297D-03  | −3.137D-03  | −4.810D-04  | −3.739D-03  |
| 5th | 2.443D-02    | 1.157D-02   | 5.846D-03   | 1.383D-03   | 5.278D-04   |
| TOB | 2.647D-02    | 1.394D-03   | T. EL. COMA |             |             |
| SOB | 1.302D-02    | 1.604D-03   | S. EL. COMA |             |             |
|     | OBJECT HEIGHT |            |             | PUP. SPH.   |             |
|     | −8.000D 01   |             |             | −1.400D 02  |             |

Figure 5:
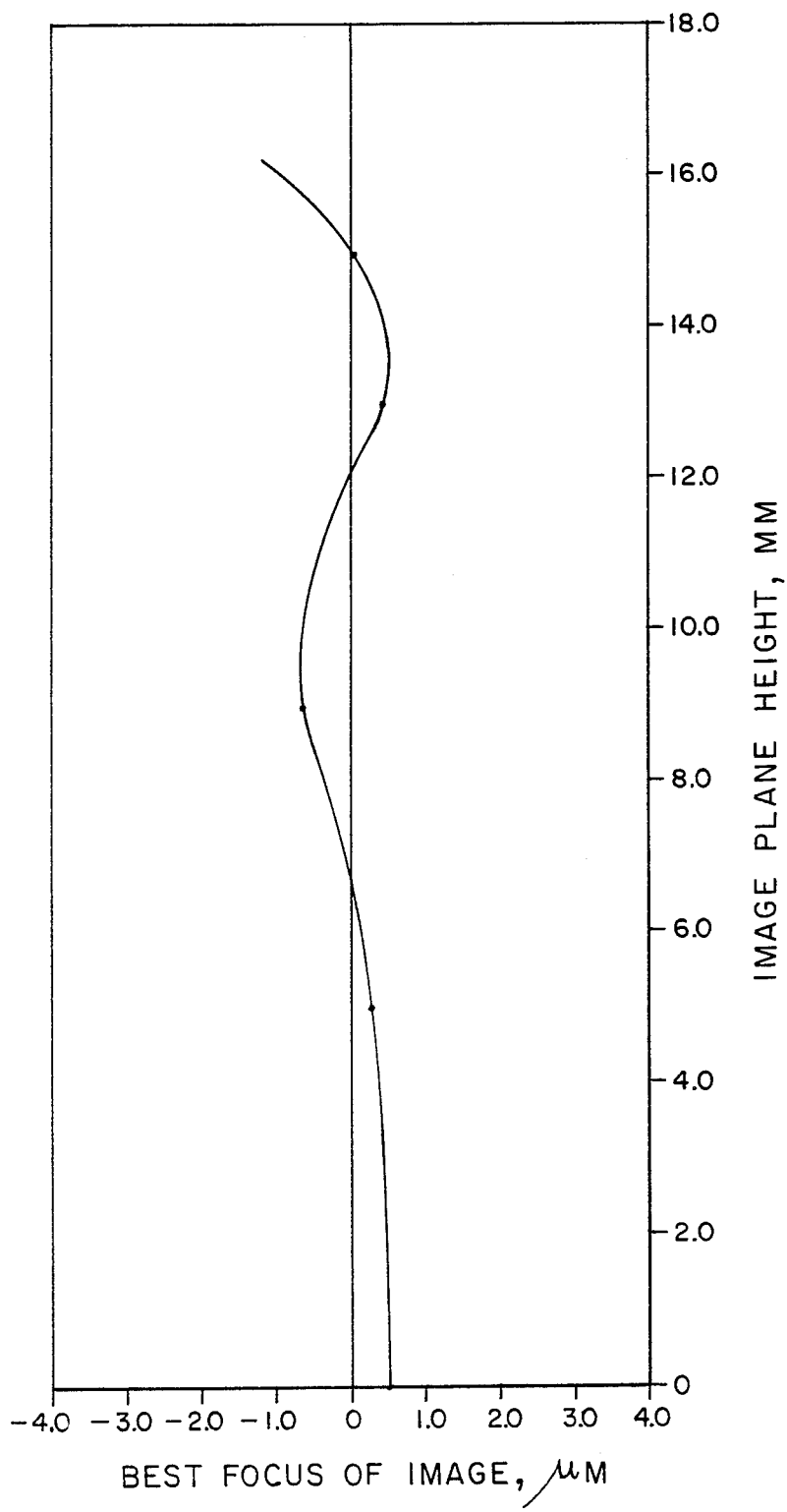
FIG. 5 is a graph of best focus versus height of image for the lens of FIG. 4.

The resulting curve of best focus versus height of image is given in FIG. 5. It will be noted that the third cross-over is retained but that the inward curve at the edge of the field is reduced.

Figure 6:
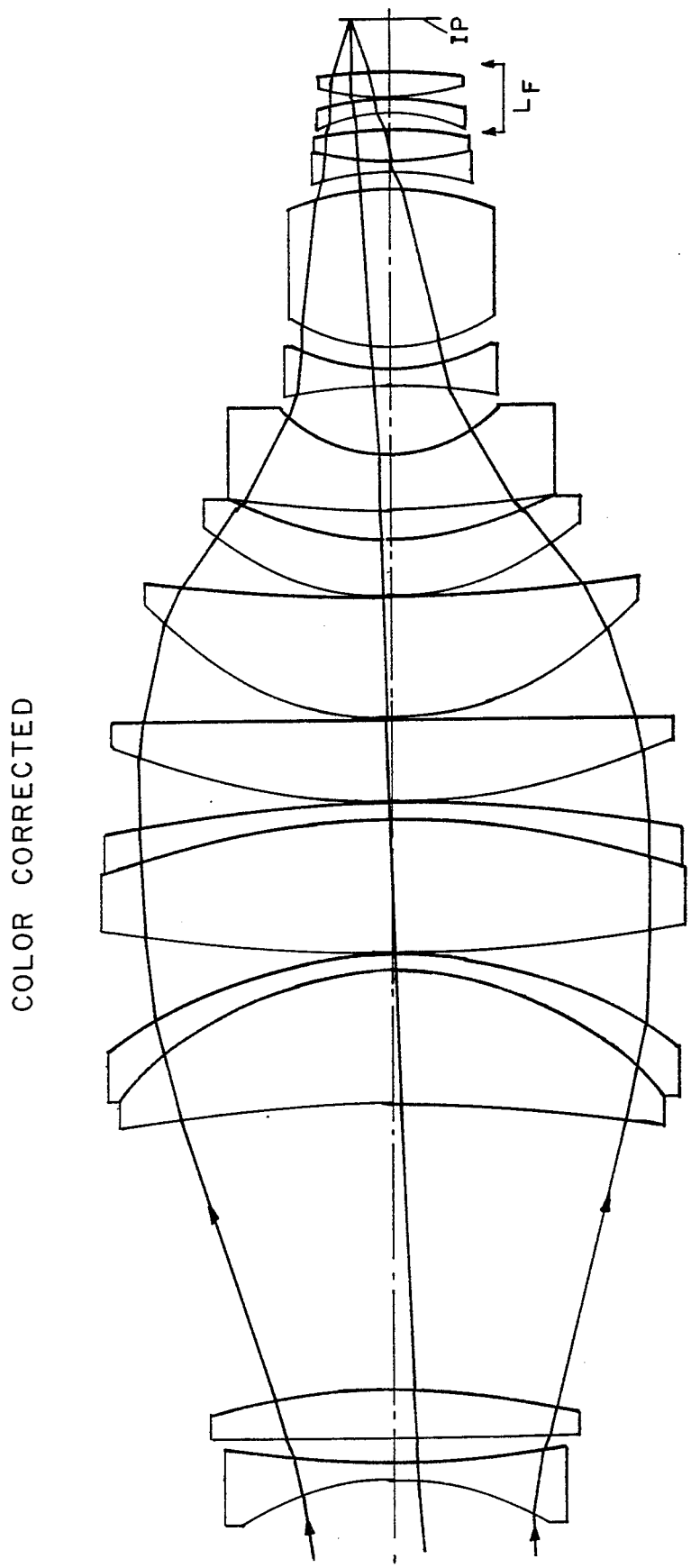
FIG. 6 is a diagram of a color corrected version of the lens of this invention.

By further refinement of this design a final color corrected version was obtained. The color correction is for the mercury h line with a bandwidth of λ=0.4015 μM, to λ=0.4095 μM. This design is illustrated in FIG. 6 and its prescription is given in Table X.

TABLE X

COLOR CORRECTED DESIGN
Wavelength 0.40550 μm

| SURFACE | RADIUS     | THICKNESS | INDEX   | Glass  |
|---------|------------|-----------|---------|--------|
| 1       | INF        | 559.9946  | 1.00000 | OBJECT |
| 2       | −95.7445   | 5.0000    | 1.65037 | F 2    |
| 3       | 348.5082   | 7.0000    | 1.00000 | AIR    |
| 4       | 2077.5733  | 15.0000   | 1.53013 | BK 7   |
| 5       | −226.3515  | 86.3671   | 1.00000 | AIR    |
| 6       | −513.5375  | 40.0000   | 1.53013 | BK 7   |
| 7       | −110.9468  | 5.0000    | 1.65037 | F 2    |
| 8       | −149.9673  | 0.2833    | 1.00000 | AIR    |
| 9       | INF        | 0.2833    | 1.00000 | STOP   |
| 10      | 584.7223   | 40.0000   | 1.53013 | BK 7   |
| 11      | −277.5577  | 5.0000    | 1.65037 | F 2    |
| 12      | −455.4381  | 0.5665    | 1.00000 | AIR    |
| 13      | 225.8346   | 25.0000   | 1.60516 | SK 5   |
| 14      | 6054.7972  | 0.5665    | 1.0000  | AIR    |
| 15      | 100.8228   | 36.0000   | 1.60516 | SK 5   |
| 16      | 462.9544   | 0.5665    | 1.00000 | AIR    |
| 17      | 88.7592    | 17.1524   | 1.53013 | BK 7   |
| 18      | 114.8973   | 9.0000    | 1.00000 | AIR    |
| 19      | 307.6481   | 16.5031   | 1.65037 | F 2    |
| 20      | 46.1159    | 21.0000   | 1.00000 | AIR    |
| 21      | −172.3442  | 5.0000    | 1.65037 | F 2    |
| 22      | 66.9526    | 7.2380    | 1.00000 | AIR    |
| 23      | 62.5439    | 47.0648   | 1.53013 | BK 7   |
| 24      | −91.4330   | 5.2793    | 1.00000 | AIR    |
| 25      | −75.0404   | 3.0000    | 1.65037 | F 2    |
| 26      | 134.1955   | 9.0000    | 1.63760 | SK 16  |
| 27      | −114.2712  | 5.6650    | 1.00000 | AIR    |
| 28      | −54.6337   | 4.1200    | 1.65037 | F 2    |
| 29      | −99.8189   | 0.5665    | 1.00000 | AIR    |
| 30      | 80.5440    | 7.2100    | 1.53013 | BK 7   |
| 31      | −149.4362  | 15.4547   | 1.00000 | AIR    |
| 32      | INF        | −0.0047   | 1.00000 | IMAGE  |

Figure 7:
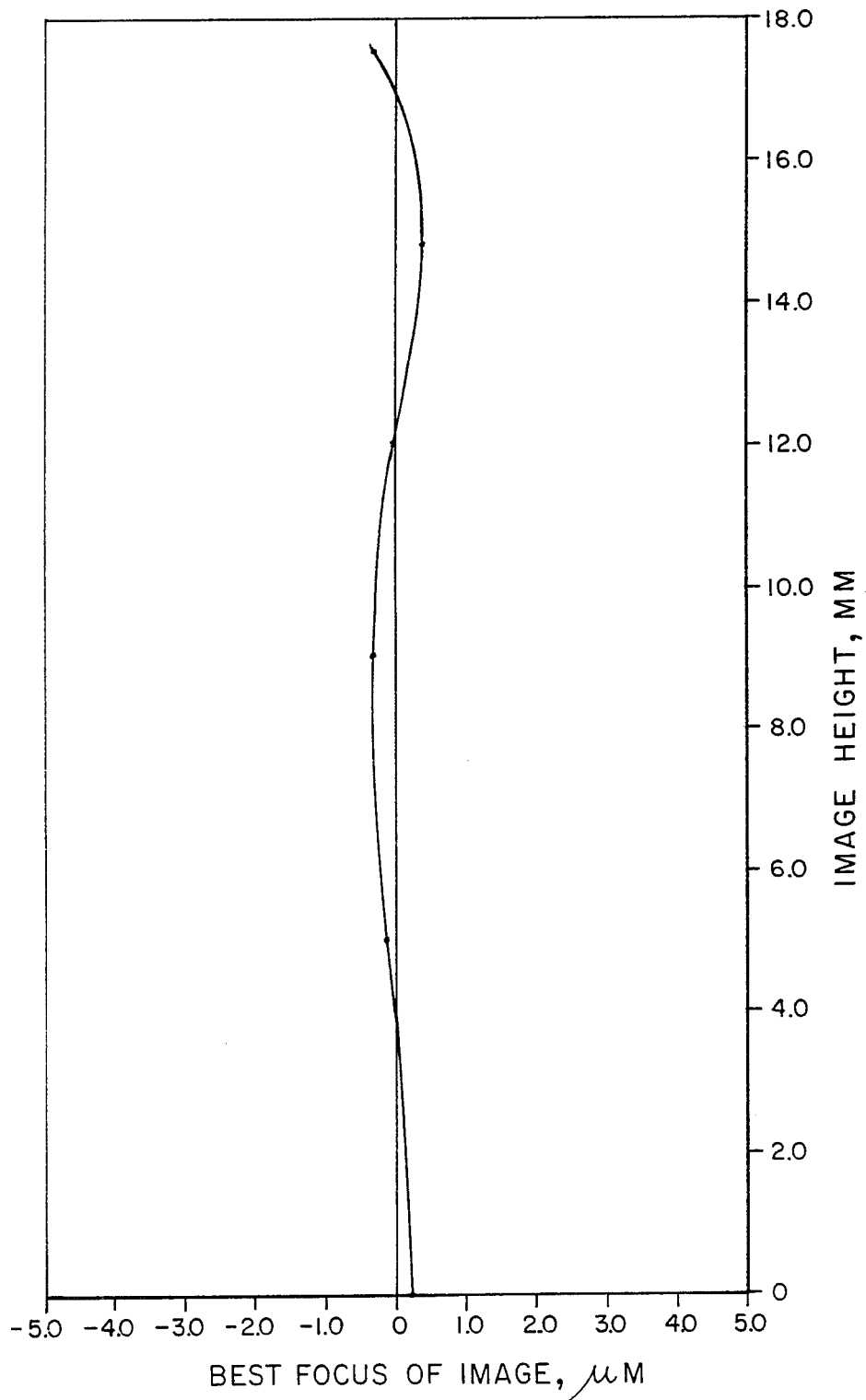
FIG. 7 is a graph of the best focus versus height of image for the lens of FIG. 6.
Figure 8:
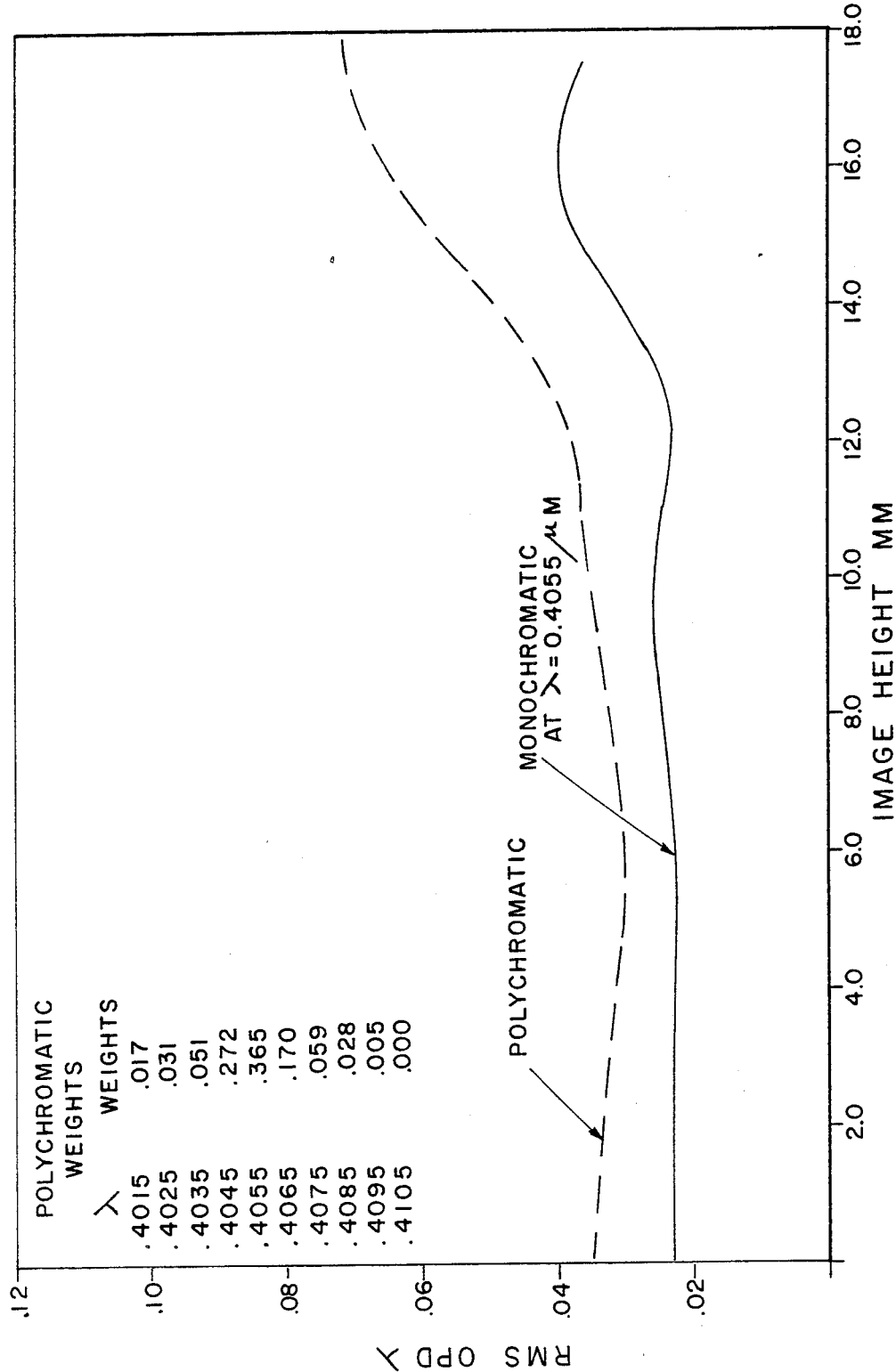
FIG. 8 is a graph of the monochromatic and weighted polychromatic performance of the lens of FIG. 6.

The third and fifth order aberrations are given in Table XI and its surface of best focus is given in FIG. 7. The monochromatic performance as well as the weighted polychromatic performance is given in FIG. 8.

TABLE XI

THIRD & FIFTH ORDER ABERRATIONS
COLOR CORRECTED DESIGN

|     | SPH.        | COMA        | AST.        | DIST.       | PETZ.       | LON. CHR. | LAT. CHR  |
|-----|-------------|-------------|-------------|-------------|-------------|-----------|-----------|
| 3RD | −9.287D-03  | −1.065D-03  | −1.132D-03  | 9.981D-05   | −2.610D-03  | 1.409D-06 | 1.705D-07 |
| Δ3D | 2.384D-03   | −2.203D-04  | −1.294D-03  | −1.175D-04  | 9.882D-04   |           |           |
| 5TH | 1.008D-02   | 3.56D-03    | 4.238D-03   | −1.048D-04  | 6.749D-04   |           |           |
| TOB | 2.010D-02   | 8.731D-04   | T. EL. COMA |             |             |           |           |
| SOB | 1.257D-02   | 1.820D-03   | S. EL. COMA |             |             |           |           |
|     | OBJECT HEIGHT |           |             | PUP. SPH.   |             |           |           |
|     | −8.750D 01  |             |             | 1.404D 01   |             |           |           |

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

I claim:

1. In a lens assembly including a field flattener as the last element before the image plane, the improvement wherein said field flattener comprises:
    a strong negative first element having surfaces which over correct the third order Petzval curvature; and
    a strong positive second element disposed between said first element and the image plane having surfaces which substantially offset the over correction introduced by the first element.

2. The improvement of claim 1 wherein said second element substantially corrects fifth order Petzval curvature.

* * * * *